United States Patent [19]

Bubica et al.

[11] Patent Number: 4,985,598
[45] Date of Patent: Jan. 15, 1991

[54] APPARATUS AND METHOD FOR SUPPORTING A CABLE SPLICE IN A CABLE SPLICE ENCLOSURE

[76] Inventors: Svetko Bubica, 1820 - 126th Street, Surrey, British Columbia, Canada, V4A 3P5; Mervyn J. Leik, 14427 - 17th Avenue, White Rock, British Columbia, Canada, V4A 1T6

[21] Appl. No.: 428,943

[22] Filed: Oct. 30, 1989

[51] Int. Cl.$^5$ .................. H02G 15/113; H02G 1/14
[52] U.S. Cl. .................................. 174/93; 156/49; 174/21 R; 174/88 R; 174/92
[58] Field of Search ............. 174/88 R, 92, 93, 21 R; 156/49

[56] References Cited

U.S. PATENT DOCUMENTS

| | | | |
|---|---|---|---|
| 3,619,481 | 10/1969 | Smith | 174/93 X |
| 4,424,412 | 1/1984 | Goetter et al. | 174/92 |
| 4,484,962 | 11/1984 | Dienes et al. | 156/49 |
| 4,500,371 | 2/1985 | De Groot | 156/49 X |
| 4,533,788 | 8/1985 | Pokojny et al. | 174/88 C |
| 4,538,021 | 8/1985 | Williamson, Jr. | 174/92 |
| 4,634,804 | 1/1987 | Spalding | 174/24 |
| 4,647,713 | 3/1987 | de Nijs et al. | 174/21 R |
| 4,647,718 | 3/1987 | Pokojny et al. | 174/88 C |
| 4,647,719 | 3/1987 | Campbell et al. | 174/93 |
| 4,692,564 | 9/1987 | Campbell et al. | 174/92 |
| 4,783,227 | 11/1988 | Meador | 156/49 |

Primary Examiner—Morris H. Nimmo
Attorney, Agent, or Firm—Shlesinger & Myers

[57] ABSTRACT

An apparatus for supporting a cable splice in a cable splice enclosure includes a rectangular cradle portion of flexible net having first and second parallel, opposite longitudinal sides and first and second parallel, opposite transverse sides; the transversed sides interconnecting the first and second longitudinal sides. The cradle portion has first and second sleeves disposed longitudinally thereon with the first and second sleeves being parallel and spaced apart from each other. A cover portion of flexible net has first and second opposite cover sides, with the first cover side being connected to the cradle portion. A connector is on the second cover side of the cover portion and is releasably connectable with the cradle portion. A method of supporting a cable splice in an enclosure includes providing a rectangular cradle portion and a rectangular cover portion of flexible net; securing the cradle portion between first and second torque bars of the enclosure so that the cradle portion extends under the cable splice; passing the cover portion over the cable splice towards the second torque bar; and tightening the cover portion over the splice to draw the splice radially inwardly within the enclosure.

19 Claims, 5 Drawing Sheets

APPARATUS AND METHOD FOR SUPPORTING A CABLE SPLICE IN A CABLE SPLICE ENCLOSURE

BACKGROUND OF THE INVENTION

A cable splice such as found in a telecommunications cable is ordinarily housed within a protective cover known as a cable splice enclosure. Such enclosures often have cylindrical covers with one or more longitudinal joints and circular end plates that surround incoming and outgoing cables. Seals between the plates and the cables, and between the plates and the covers protect the splice from contamination. Usually, two rigid metal bars, known as torque bars, extend longitudinally on diametrically opposite sides of the enclosure, between the oppositely facing end plates. The splice must be kept within the bounds of the enclosure, as defined by the two torque bars and the two end plates, to ensure the cylindrical covers can be fastened to the end plates.

When a cable splice is made, individual wires in the cable are separated from bundles of wires. Typically bundled wires are densely packed within the cable and therefore occupy only a minimum amount of space. When the individual wires are separated however, a greater amount of space is required. In addition, cables are typically connected together using crimped connectors which also occupy a considerable amount of space. Thus the splice often occupies a large amount of space within the enclosure.

The splice can also be quite heavy, tending to hang downwards below the bounds of the enclosure. The torque bars typically extend on either side of the splice i.e. the bars are spaced generally horizontally apart, and therefore provide no direct support for the splice. It is, however, desirable to provide support for the splice to confine it within the bounds of the enclosure so that individual wires do not rub against the enclosure or hang outside the enclosure.

Usually, after a splice is made, individual wires are tied into bundles using waxed string. This enables the individual wires to be tightly drawn together to occupy less space within the enclosure. After the bundles are tied, any of several methods is employed to support and protect the splice. One method involves the use of a non-adhesive, approximately 1¼inch wide woven cloth tape known as "U.G. tape". The tape is tied to a torque bar, looped under the splice and wrapped or tied around the other torque bar. This is repeated several times along the length of the splice to create a cradle formed by a series of loops extending between the two torque bards. Another method of making a cradle involves a similar tying and looping process but instead of the U.G. tape, a one-inch fibre glass tape is used. After a cradle has been created, the entire length of the splice is further wrapped helically in a fine pitch using an approximately three-inch wide non-adhesive cloth tape known as muslin tape. The splice is wrapped tightly to ensure the bundles of wires are drawn radially inwardly within the bounds of the enclosure. The enclosure covers are then installed and the repair operation is completed.

The use of the above methods for wrapping a cable splice presents problems to repairmen who are later required to open the splice for maintenance or other work. In order to gain access to any particular wire pair within the splice, the repairman must unwrap the muslin tape to expose the entire splice while the U.G. tape or fibre glass tape remains intact, unless access to a lower portion of the splice is necessary, in which case the cradle is cut. The repair or maintenance work can then be performed, after which the repairman is required to recreate the cradle if the previous cradle was cut and is required to rewrap the splice with muslin tape. This can be very time consuming.

Often, cable splice enclosures are located in manholes or on above-ground cables rendering them susceptible to water contamination while the enclosure covers are removed. It will be appreciated that water can be retained within the muslin tape. Should the enclosure covers be installed while the muslin tape is wet, the tape is susceptible to rotting and the cable splices are susceptible to corrosion. Thus, should water come in contact with the muslin tape, the tape must be dried before the enclosure covers are installed.

SUMMARY OF THE INVENTION

It is apparent that current methods of wrapping and supporting a cable splice present problems. These problems may be considerably reduced by providing a cable splice support which may be easily installed in a cable splice enclosure and easily removed therefrom. It is desirable for such a support to be non-flammable, electrically insulating and porous to permit water to pass therethrough to permit drying of the splice. Such a need is addressed by the present invention.

The present invention provides an apparatus and method of supporting a cable splice. The apparatus includes a rectangular cradle portion of flexible net having first and second parallel opposite longitudinal sides and first and second parallel opposite transverse sides, the transverse sides interconnecting the first and second longitudinal sides. The cradle portion has first and second sleeves disposed longitudinally on the cradle portion, the first and second sleeves being parallel and spaced apart from each other. A cover portion of flexible net has first and second opposite cover sides, with the first cover side being connected to the cradle portion. The apparatus is provided with cover connecting means for releasably connecting the second cover side of the cover portion to the cradle portion.

The first and second sleeves are operable to receive first and second torque bars of a cable splice enclosure. The cradle portion is thus suspended between the first and second torque bars under the cable splice. The cover portion is then passed over the splice and tightly secured to the cradle portion using the cover connecting means, thereby drawing the splice radially inward within the bounds of the enclosure.

To open the cable splice, the cover portion is released from the cradle portion and folded away from the splice thereby exposing the splice for easy access. When maintenance on the splice is completed, the apparatus may be reinstalled as described above. It will be readily apparent that the apparatus provides quick, easy access to the splice without excessive installation or removal time. The flexible net material permits water to drain away from the splice and is partially transparent to permit viewing of wires etc. while the apparatus is in place. In addition, the apparatus protects the splice from rubbing against the enclosure covers and prevents wires from hanging outside the bounds of the enclosure.

A method of supporting a cable splice between first and second torque bars of a cable splice enclosure includes the steps of:

(a) providing a rectangular cradle portion and a rectangular cover portion of flexible net;

(b) securing the cradle portion between the first and second torque bars so that the cradle portion extends under the cable splice;

(c) passing the cover portion over the cable splice towards the second torque bar; and (d) tightening the cover portion over the splice to draw the splice radially inwardly within the enclosure.

DESCRIPTION OF THE PREFERRED EMBODIMENT

Apparatus

Figure 1:
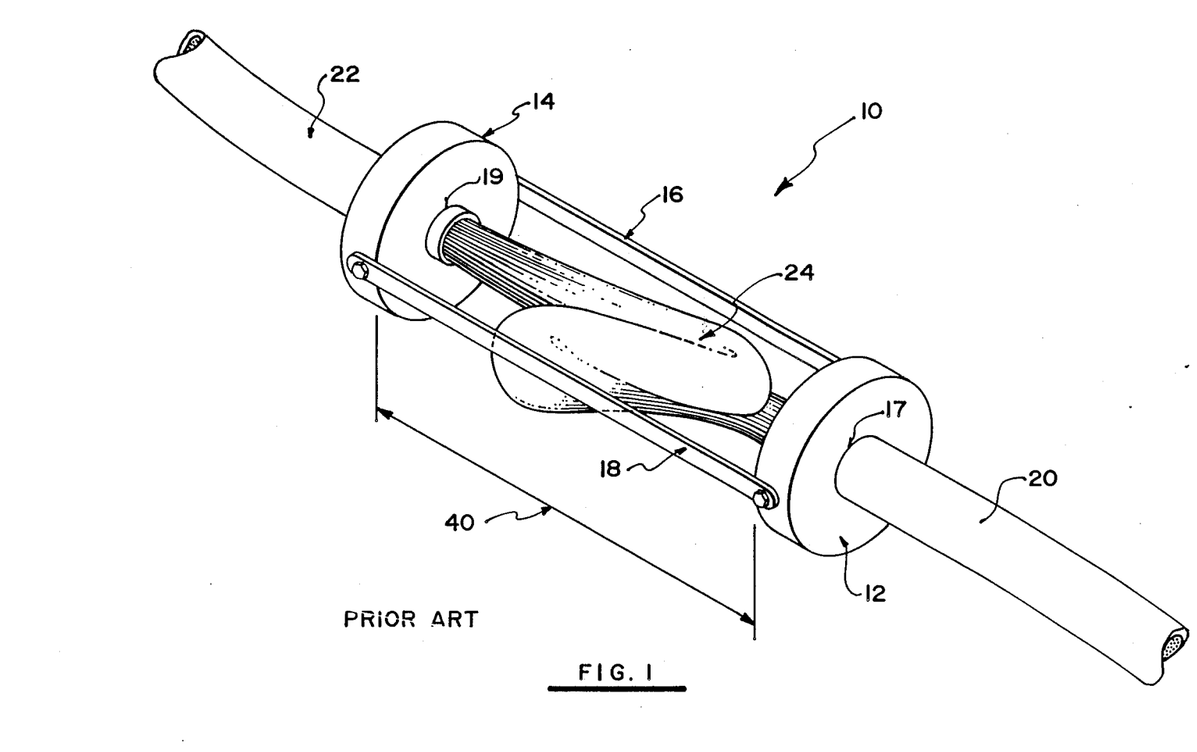
FIG. 1 a perspective view of a conventional cable splice enclosure with covers removed showing a cable splice before installation of supporting structure.

Referring to FIG. 1, a conventional cable splice enclosure is shown generally at 10. The enclosure has first and second longitudinally spaced apart circular end plates 12 and 14 having similar circumferences. Generally horizontally spaced apart first and second torque bars 16 and 18 are connected to and extend between the end plates on diametrically opposite sides thereof. The first and second end plates have openings 17 and 19 respectively to receive, and are connected to, incoming and outgoing telecommunications cables 20 and 22 respectively. A cable splice, shown generally at 24, connects the incoming and outgoing cables and is disposed between the end plates 12 and 14 and between the torque bars 16 and 18. Conventionally, the splice would be supported by a cradle formed by looping tape between the torque bars, under the splice.

Figure 2:
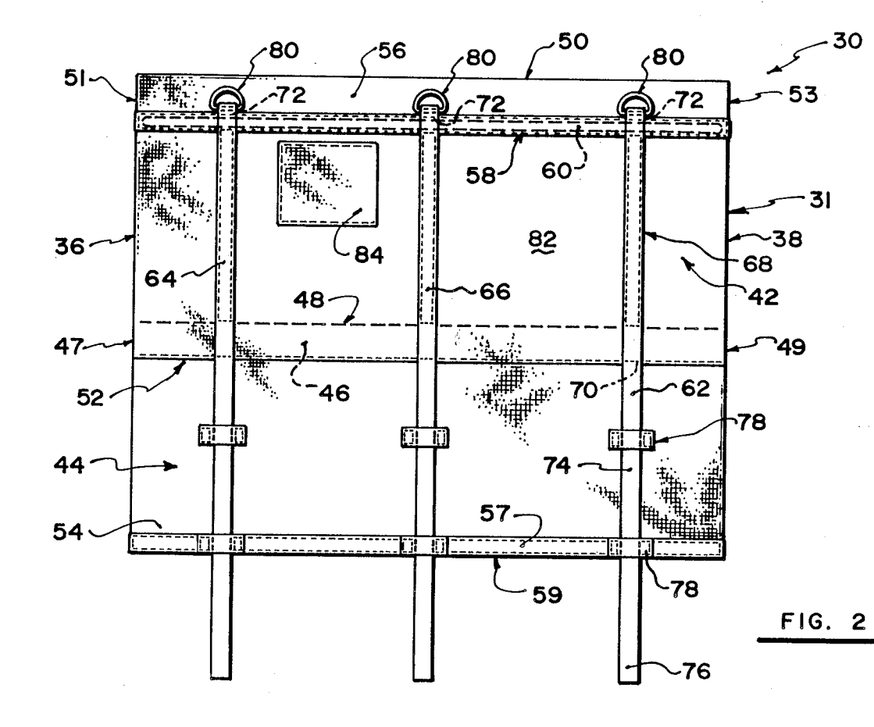
FIG. 2 is a plan view of an apparatus according to a first embodiment of the invention.

Referring to FIG. 2, an apparatus according to a first embodiment of the invention, for supporting the cable splice of FIG. 1 is shown generally at 30. In the preferred embodiment, the apparatus is comprised of a unitary generally rectangular sheet portion 31 of flexible polyester net material having a relatively fine mesh e.g. approximately one-sixteenth inch mesh. The fine mesh permits air and water to pass through the material, provides a limited degree of transparency and has sufficient strength to provide support for the cable splice as will be further explained below.

The sheet 31 includes a rectangular cradle portion 42 and a cover portion 44, the cradle and cover portions being respective portions of the unitary rectangular sheet. The cradle portion has first and second parallel, opposite longitudinal sides 48 and 50 and first and second parallel opposite transverse sides 36 and 38 interconnecting the first and second longitudinal sides. The first and second longitudinal sides 48 and 50 each have a length approximately equal to the distance between the end plates 12 and 14 indicated by arrow 40 in FIG. 1. The transverse sides 36 and 38 each have a length of approximately one-half of the circumference of the end plates.

A first sleeve 46 is disposed longitudinally approximately centrally of the rectangular sheet 31 and generally coincident with the side 48. The first sleeve is formed by stitching a 1½ in wide strip of nylon or mesh material onto the sheet 31. The strip thus forms one side of the sleeve while a portion of the sheet opposite the strip forms an opposite side of the sleeve. The first sleeve is thus integral with the sheet. The first sleeve extends substantially the length of the sheet and therefore extends substantially the length of the first longitudinal side 48. The first sleeve has first openings 47 and 49 at opposite ends thereof and adjacent the transverse sides 36 and 38 respectively, the openings being dimensioned to receive one of the torque bars, e.g. the first bar 16, within the first sleeve 46.

A second sleeve 56, similar to the first sleeve 46, is formed by folding a portion of the second longitudinal side 50 back onto the sheet 31 and stitching it thereto, making the second sleeve integral with the unitary sheet 31. The second sleeve 56 is thus parallel to and spaced apart from the first sleeve 46 and is generally coincident with the second longitudinal side 50 of the cradle portion, opposite the first sleeve. The second sleeve also has second openings 51 and 53 adjacent the transverse sides 36 and 38 respectively, the openings being dimensioned to receive the other, i.e. the second bar 18, of the torque bars. Thus the first and second sleeves act as first and second securing means respectively for securing the cradle portion to the first and second torque bars respectively.

A third sleeve 58 extends adjacent and parallel to the second sleeve 56. The third sleeve is formed by stitching a narrow strip of material such as nylon onto the sheet 31 immediately adjacent, and parallel to the second sleeve. A rigid member, which, in this embodiment is a cylindrical plastic rod 60 having a length equal to the length of the second longitudinal side 50, is held within the third sleeve 58. The rod acts to spread the cradle portion longitudinally. The rod 60 and third sleeve 58 therefore act as spreading means for spreading the cradle portion longitudinally.

The cover portion 44 has first and second opposite cover sides 52 and 54. The first cover side 52 is connected to the first sleeve 46 of the cradle portion by virtue of it being a portion of the unitary sheet 31. Due to the flexibility of the unitary sheet, the cover portion can be folded about or swung relative to the first sleeve 46. The second cover side 54 has an outer edge 59 along which a narrow strip of nylon 57 is stitched to provide reinforcing and to prevent fraying of the edge 59.

Extending laterally across the sheet 31 are first, second and third nylon straps shown generally at 62, 64 and 66. The first and second straps are parallel to and generally adjacent the second and first transverse sides 38 and 36 respectively. The third strap 66 is located centrally of the sheet between and parallel to the straps 62 and 64. The first strap has a fixed portion 68 connected between the first and second sleeves 46 and 56. In the embodiment shown, stitches 70 connect a first end of the fixed portion 68 to the first sleeve 46 and stitches 72 connect a second end to the second sleeve 56. Alternatively, or in addition, the fixed portion may be stitched directly onto the cradle portion 42.

Adjacent the first end of the strap, the fixed portion 68 is connected to a slidable portion 74, the slidable portion having a free portion 76. Nylon strap guides 78 are stitched onto the cover portion 44 to form loops through which the slidable portion 74 is inserted. The strap guides are located on the cover portion such that the first strap is maintained in alignment parallel with the transverse sides 36 and 38. The free portion 76 of the strap extends outward of the sheet 31, past the second side 54 of the cover portion 44.

The first strap has a D-ring connector 80 connected to the second end of the fixed portion 68, adjacent the second sleeve 56. The connector 80 is operable to engage the free portions 76 of the strap and may be adjusted to be fastened to the free portion at any of a plurality of locations. The strap and D-ring connector act as cover connecting means for releasably connecting the second side of the cover portion to the cradle portion. The second and third straps 64 and 66 have structure and connectors similar to those of the first strap and therefore are not discussed further.

In the embodiment shown, an outer surface of the rectangular sheet 31 is shown generally at 82. The sleeves 46, 56 and 58, the fixed portions of the straps 62, 64 and 66, and the loops 78 are connected to the outer surface. The outer surface also has a pocket 84 stitched thereon for receiving a card or papers identifying cable splice connections etc. It will be appreciated that the net also has an inner surface 86 shown in FIG. 3, which is opposite the outer surface, the inner surface being smooth for contacting the cable splice without snagging wires etc.

Method of Use

Figure 3:
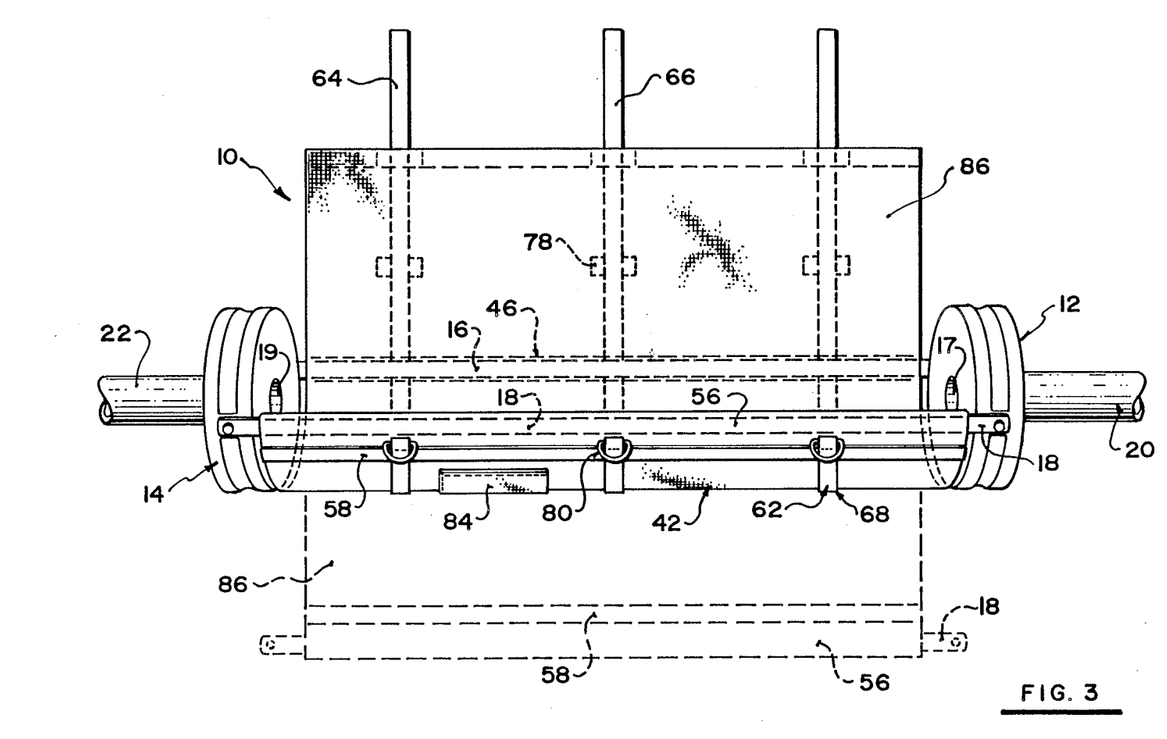
FIG. 3 is a perspective view of the apparatus of FIG. 2 shown installed on torque bars of the cable splice enclosure of FIG. 1 with a cover portion of the apparatus extending upwardly from a cradle portion of the apparatus.
Figure 5:
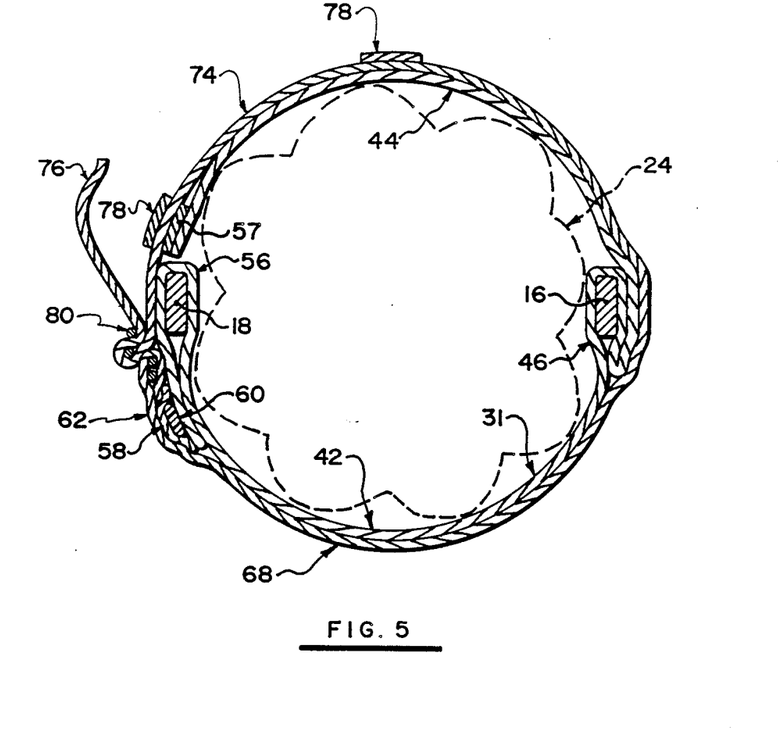
FIG. 5 is a simplified cross-sectional view of the apparatus and enclosure of FIG. 4 taken along lines 5—5 of FIG. 4, spacing between components being exaggerated.

To use the apparatus 30 of FIG. 2, the first and second torque bars 16 and 18 of FIG. 1 are removed from the end plates 12 and 14. Referring to FIGS. 3 and 5, the torque bars 16 and 18 are inserted into the first and second sleeves 46 and 56 and are then reinstalled between the first and second end plates 12 and 14. The cradle portion 42 thus extends under the splice 24 shown in FIG. 5 and is operable to provide support for the splice. Additional support is provided by the fixed portion 68 of the first strap 62 and equivalent portions of the second and third straps 64 and 66. The cradle portion is thus secured between the first and second torque bars so that the cradle portion extends under the cable splice.

Figure 4:
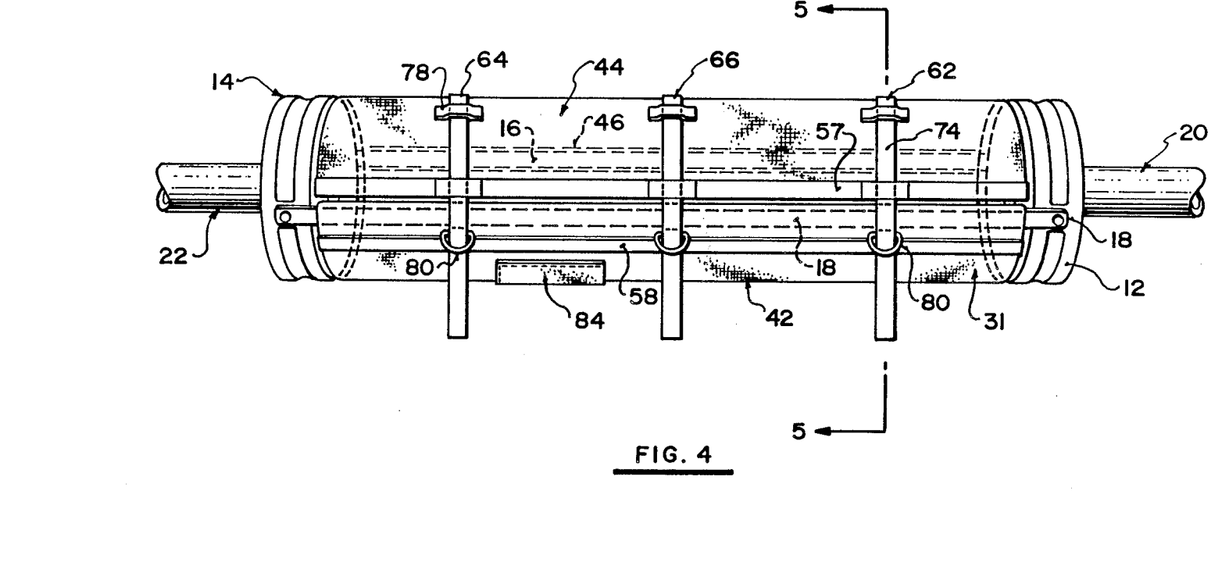
FIG. 4 is a perspective view of the apparatus of FIG. 2 shown enclosing a cable splice within the bounds of the enclosure.

Referring to FIGS. 4 and 5, the cover portion 44 is then passed over the splice towards the second torque bar and generally encircles the splice. It will be appreciated that the first and second longitudinal sides of the cradle portion and the first and second opposite sides of the cover portion have sufficient length to extend between the end plates to dispose the transverse sides of the cradle portion adjacent the end plates. The free portions 76 of the straps 62, 64 and 66 are engaged in respective D-ring connectors 80 and pulled relative to the connectors to tighten the cover portion 44 over the splice to draw and tighten the splice radially inwardly within the bounds of the enclosure as defined by an outer circumference of the first and second end plates 12 and 14. The straps 62, 64 and 66 and D-ring connectors 80 thus act as tightening means for tightening the cover portion over the cradle portion draw the splice radially inwardly within the enclosure.

The free portions of the straps 62, 64 and 66 may then be tucked under respective slidable portions 74 and conventional, clam-shell type enclosure covers (not shown) may be installed to hermetically seal the enclosure and protect the splice from damage.

Should maintenance on the splice be required, the enclosure covers may be removed, the free portions 76 of the straps 62, 64 and 66 released from the D-ring connectors 80 and the cover portion 44 may be removed from its position over the splice into the position illustrated in FIG. 3. Wires spliced near a top portion of the overall splice are readily accessible without further removal of any components such as torque bars etc. It will be appreciated that the use of muslin tape as used in the prior art has been eliminated and therefore the process of helical unwrapping of muslin tape is also eliminated by the use of the apparatus.

Should splices near the bottom of the overall splice require accessing, the second torque bar 18 may then be removed and the cradle portion 42 may be left to hang downwards from the first sleeve 46 on the first torque bar 16 as shown in broken outline in FIG. 3. The splice may then be maintained without interference by the apparatus 10.

The bottom portion of the splice may be re-supported by re-fastening the second torque bar 18 between the first and second end plates 12 and 14 and the procedure described above for covering the splice may be followed.

ALTERNATIVES

In an alternative embodiment, the first and second sleeves are replaced by conventional canvas dome fasteners having complementary portions on the first and second torque bars and on the first and second longitudinal edges 48 and 50 respectively. Alternatively, hooks on the torque bars engaging openings in the sheet 31, or other easily removable fasteners may be used to fasten the cradle portion between the first and second torque bars.

In another alternative embodiment, the free portions of the straps have openings therein and the D-ring connectors are replaced by buckles engagable with the openings. Alternatively, any connector capable of releasably tightening the free portions of the straps to the second sleeve may be used.

It will be appreciated that in the embodiment described and shown, the distance between the end plates of the enclosure is greater than the distance around the circumference of the end plates. It is however, conceivable that cable splice enclosures having end plates with a circumference greater than the distance between the end plates could also achieve the benefits of the apparatus. If such an enclosure was employed then the terms longitudinal and transverse as used herein to describe certain sides of the apparatus would have meanings contrary to their conventional meanings because the longitudinal sides would be shorter than the transverse sides. It will be appreciated therefore that the longitudinal sides are defined as the sides of the apparatus which extend axially between the end plates while the transverse sides are defined as the sides of the apparatus which are intended to extend parallel to portions of the circumference of the end plates.

While specific embodiments of the invention have been described, such embodiments should be considered illustrative of the invention only and not as limiting the invention as construed in accordance with the accompanying claims.

What is claimed is:

1. An apparatus comprising:

(a) a rectangular cradle portion of flexible net having first and second parallel opposite longitudinal sides and first and second parallel opposite transverse sides interconnecting the first and second longitudinal sides, and first and second parallel, spaced apart sleeves disposed on and extending longitudinally of the cradle portion;

(b) a cover portion of flexible net having first and second opposite cover sides, the first cover side being connected to the cradle portion;

(c) cover connecting means for releasably connecting the second side of the cover portion to the cradle portion.

2. An apparatus as claimed in claim 1 wherein the apparatus includes a unitary, generally rectangular sheet portion of flexible net material, the cradle and cover portions being respective portions of the unitary, generally rectangular sheet portion.

3. An apparatus as claimed in claim 2 wherein the first and second sleeves are integral with the unitary rectangular sheet and extend substantially the length of the sheet.

4. An apparatus as claimed in claim 1 wherein the second sleeve is on the second longitudinal side.

5. An apparatus as claimed in claim 4 wherein the cradle portion has a rigid member extending parallel to the second sleeve, the rigid member being connected to the cradle portion.

6. An apparatus as claimed in claim 5 wherein the cradle portion has a third sleeve extending parallel to and adjacent the second sleeve, the third sleeve being operable to receive and hold the rigid member.

7. An apparatus as claimed in claim 1 wherein one of the cradle and cover portions has an inner surface for contacting the cable splice and an outer surface having a pocket therein for receiving cable splice records.

8. An apparatus as claimed in claim 1 wherein the cover connecting means includes tightening means for tightening the cover portion over the cradle portion.

9. An apparatus as claimed in claim 8 wherein the tightening means includes a first strap connected to the cover portion and an adjustable connector on the second sleeve, the adjustable connector being connectable to the strap at any of a plurality of locations.

10. An apparatus as claimed in claim 9 wherein the first strap has a fixed portion connected between the first sleeve and the second sleeve and a slidable portion extending from the first sleeve across the cover portion, the cover portion having guide loops through which the slidable portion extends to guide the slidable portion laterally across the cover portion, the slidable portion having a free portion extending past the cover portion and being engagable with the adjustable connector.

11. An apparatus as claimed in claim 9 wherein the adjustable connector includes a D-ring connector.

12. An apparatus as claimed in claim 1 wherein the apparatus includes:

(a) a unitary, generally rectangular sheet portion of flexible net, the cradle and cover portions being respective portions of the unitary rectangular portion;

(b) tightening means for tightening the cover portion over the cradle portion, the tightening means including first and second straps connected to the cover portion, the first and second straps having respective fixed portions connected between the first sleeve and the second sleeve, and having first and second slidable portions extending from the first sleeve across the cover portion, the cover portion having respective guide loops through which respective slidable portions extend to guide the respective slidable portions laterally across the cover portion, the respective slidable portions having respective free portions extending past the cover portions; and (c) first and second adjustable connectors on the second sleeve, the adjustable connectors being connectable to the first and second straps respectively at any of a plurality of locations along the respective free portions of the first and second straps.

13. A method of supporting a cable splice between first and second torque bars of a cable splice enclosure, the method including the steps of:

(a) providing a rectangular cradle portion and a rectangular cover portion of flexible net;

(b) securing the cradle portion between the first and second torque bars so that the cradle portion extends under the cable splice;

(c) passing the cover portion over the cable splice towards the second torque bar; and (d) tightening the cover portion over the splice to draw the splice radially inwardly within the enclosure.

14. An apparatus for supporting a cable splice between first and second torque bars of a cable splice enclosure, the apparatus comprising:

(a) a rectangular cradle portion of flexible net having first and second securing means for securing the cradle portion to the first and second torque bars respectively, the second securing means being on the cradle portion opposite the first securing means;

(b) a rectangular cover portion of flexible net bendable longitudinally and having first and second opposite sides, the first side being connected to the cradle portion; and (c) cover connecting means for releasably connecting the second side of the cover portion to the cradle portion.

15. An apparatus as claimed in claim 14 wherein the first securing means includes a first sleeve extending substantially the length of the cradle portion.

16. An apparatus as claimed in claim 15 wherein the second securing means includes a second sleeve parallel to and spaced apart from the first sleeve.

17. In combination:

(a) a cable splice enclosure having first and second spaced apart circular end plates and first and second torque bars extending between the plates; and (b) an apparatus comprising:

(i) a rectangular cradle portion of flexible net having first and second parallel opposite longitudinal sides and first and second parallel opposite transverse sides adjacent the first and second longitudinal sides, and first and second parallel, spaced apart sleeves disposed longitudinally of the cradle portion;

(ii) a cover portion of flexible net having first and second opposite cover sides, the first cover side being connected to the cradle portion;

(iii) cover connecting means for releasably connecting the second side of the cover portion to the cradle portion.

18. An apparatus as claimed in claim 17 wherein the first and second longitudinal sides of the cradle portion and the first and second opposite cover sides of the cover portion have sufficient length to extend between the end plates to dispose the transverse sides of the cradle portion adjacent the end plates.

19. An apparatus as claimed in claim 18 wherein the end plates both have a similar circumference and the transverse sides of the cradle portion have a length of approximately one-half of the circumference of the end plates.

* * * * *